United States Patent
Cinpinski et al.

(10) Patent No.: US 10,611,369 B2
(45) Date of Patent: Apr. 7, 2020

(54) SYSTEMS AND METHODS FOR COLLISION DETECTION IN AUTONOMOUS VEHICLES

(71) Applicant: GM GLOBAL TECHNOLOGY OPERATIONS LLC, Detroit, MI (US)

(72) Inventors: Christopher Cinpinski, Chesterfield, MI (US); Stephen W. Erskine, Sterling Heights, MI (US); Zhe Xie, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 15/886,028

(22) Filed: Feb. 1, 2018

(65) Prior Publication Data

US 2019/0232954 A1 Aug. 1, 2019

(51) Int. Cl.
*B60W 30/09* (2012.01)
*B60W 40/10* (2012.01)

(52) U.S. Cl.
CPC ............ *B60W 30/09* (2013.01); *B60W 40/10* (2013.01); *B60W 2420/42* (2013.01); *B60W 2420/52* (2013.01)

(58) Field of Classification Search
CPC .................................................... B60W 30/09
See application file for complete search history.

(56) References Cited

U.S. PATENT DOCUMENTS

| | | | | |
|---|---|---|---|---|
| 9,108,583 | B2* | 8/2015 | Wanami | B60K 28/14 |
| 9,392,431 | B2* | 7/2016 | Barfield, Jr. | H04Q 9/00 |
| 9,487,217 | B2* | 11/2016 | Tsuchida | B60W 50/00 |
| 9,701,307 | B1* | 7/2017 | Newman | B60W 50/16 |
| 9,836,980 | B2* | 12/2017 | Sommer | G08G 9/02 |
| 10,248,872 | B2* | 4/2019 | Viswanath | G06K 9/00805 |

* cited by examiner

*Primary Examiner* — Bao Long T Nguyen
*Assistant Examiner* — Michael A Berns
(74) *Attorney, Agent, or Firm* — Lorenz & Kopf, LLP (57) ABSTRACT

Systems and methods are provided for detecting collisions between objects and an autonomous vehicle. The system includes a computer vision system configured to use acquired environmental data to determine a velocity vector of an object relative to the autonomous vehicle and a distance between the object and the autonomous vehicle. The autonomous driving system also includes a vehicle motion sensing module configured to use acquired vehicle motion data to determine an acceleration vector of the autonomous vehicle. The autonomous driving system also includes a collision detection module configured to register a collision between the object and the autonomous vehicle when the determined acceleration vector is detected having a direction that is substantially the same as a direction of the determined velocity vector of the object and when the determined distance between the object and the autonomous vehicle is less than a predetermined amount.

15 Claims, 7 Drawing Sheets

SYSTEMS AND METHODS FOR COLLISION DETECTION IN AUTONOMOUS VEHICLES

INTRODUCTION

The present disclosure generally relates to autonomous vehicles, and more particularly relates to systems and methods for autonomous vehicle collision detection.

BACKGROUND

This section provides background information related to the present disclosure which is not necessarily prior art.

An autonomous vehicle is a vehicle that is capable of sensing its environment and navigating with little or no user input. An autonomous vehicle senses its environment using sensing devices such as Radar, LIDAR, image sensors such as cameras, and the like. The autonomous vehicle system may further use information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles, which incorporate autonomous driving agents, correspond to higher automation levels.

An autonomous vehicle should be capable of detecting collisions with external objects surrounding the autonomous vehicle.

Accordingly, it is desirable to obtain systems and methods for detecting collisions between an autonomous vehicle and external objects. Other desirable features and characteristics of the present invention will become apparent from the subsequent detailed description and the appended claims, taken in conjunction with the accompanying drawings and the foregoing technical field and background.

BRIEF SUMMARY

Systems and method are provided for detecting a collision between an autonomous vehicle and an external object, such as another vehicle, person or other object.

In one embodiment, there is provided an autonomous driving system for a vehicle. The autonomous driving system includes a computer vision system configured to use acquired environmental data to determine a velocity vector of an object relative to the autonomous vehicle and also to determine a distance between the object and the autonomous vehicle. The autonomous driving system also includes a vehicle motion sensing module configured to use acquired vehicle motion data to determine an acceleration vector of the autonomous vehicle. The autonomous driving system also includes a collision detection module configured to register a collision between the object and the autonomous vehicle when the determined acceleration vector is correlated to the determined velocity vector of the object and when the determined distance between the object and the autonomous vehicle is less than a predetermined amount.

In an embodiment, the vehicle motion data includes vehicle acceleration and/or vehicle angular rotation data, for example vehicle angular velocity data.

In an embodiment, the autonomous driving system also includes at least one environmental sensor selected from the group of: Radar, LIDAR, and an optical camera to acquire the environmental data.

In an embodiment, the predetermined amount (with which the determined distance is compared) is dynamically determined based on the magnitude of the determined relative velocity vector of the object.

In an embodiment, the autonomous driving system also includes at least one vehicle motion sensor selected from the group of an accelerometer, a pressure sensor and/or an inertial measurement unit, the at least one vehicle motion sensor being configured to acquire the vehicle motion data.

In an embodiment, the autonomous driving system further includes a vehicle control system configured to control the vehicle to a safe stop when the collision registration module registers a collision.

In an embodiment, the autonomous driving system further includes a data logging system configured to store acquired vehicle acceleration data, vehicle angular rotation data, and environmental data for a predetermined time before and after the collision registration module registers a collision. In an embodiment, the acquired vehicle acceleration data, vehicle angular rotation data, and environmental data are stored in a non-volatile memory. The stored vehicle acceleration data, vehicle angular rotation data, and environmental data may be used for machine learning, forensic, or regulatory purposes.

In an embodiment, the collision detection module is configured to register a collision between the object and the autonomous vehicle when the determined acceleration vector is detected as having a direction that is substantially the same as a direction of the determined velocity vector of the object and when the determined acceleration vector has a magnitude greater than a predetermined threshold magnitude. In an embodiment, the predetermined threshold magnitude is dynamically determined based on the magnitude of the velocity vector of the object.

In an embodiment, the collision detection module is configured to transform the acquired vehicle acceleration data using the acquired vehicle angular rotation data.

In an embodiment, a computer-implemented method of detecting a collision between an autonomous vehicle and an object is provided. The method includes the steps of, using at least one environmental sensor, acquiring environmental data; and determining, using a processor, a velocity vector of an object relative to the autonomous vehicle and a distance between the object and the autonomous vehicle on the basis of the sensed environmental data. The method also includes the step of, using at least one vehicle motion sensing module, determining an acceleration vector of the autonomous vehicle using acquired vehicle motion data. The method also includes the steps of comparing, using a processor, the distance between the object and the autonomous vehicle to a pre-determined distance; and when the distance between the object and the autonomous vehicle is less than a predetermined distance, comparing the acceleration vector to the velocity vector of the object; and when the acceleration vector can be correlated to the velocity vector of the object, registering a collision between the object and the autonomous vehicle.

In an embodiment, the at least one environmental sensor is selected from the group of: Radar, LIDAR, and an optical camera is configured to acquire the environmental data.

In an embodiment, the at least one vehicle motion sensor is selected from the group of an accelerometer, a pressure sensor and/or an inertial measurement unit.

In an embodiment, the method further includes the step of safely controlling the autonomous vehicle to a stop when a collision is registered.

In an embodiment, the method further includes the step of storing acquired vehicle acceleration data and environmental data for a predetermined time before and after the collision registration module registers a collision.

In an embodiment, the method further includes the step of comparing the acceleration vector to a predetermined threshold magnitude, and registering a collision only when the acceleration vector is greater than the predetermined threshold magnitude.

In an embodiment, the predetermined threshold magnitude is dynamically determined based on the magnitude of the velocity vector of the object.

In an embodiment, a vehicle is provided. The vehicle includes an autonomous driving system. The autonomous driving system includes a computer vision system configured to use acquired environmental data to determine a velocity vector of an object relative to the autonomous vehicle and also to determine a distance between the object and the autonomous vehicle. The autonomous driving system also includes a vehicle motion sensing module configured to use acquired vehicle motion data to determine an acceleration vector of the autonomous vehicle. The autonomous driving system also includes a collision detection module configured to register a collision between the object and the autonomous vehicle when the determined acceleration vector is correlated to the determined velocity vector of the object and when the determined distance between the object and the autonomous vehicle is less than a predetermined amount.

In an embodiment, the vehicle further includes at least one environmental sensor selected from the group of: Radar, LIDAR, and an optical camera to acquire the environmental data.

In an embodiment, the vehicle further includes at least one vehicle motion sensor selected from the group of an accelerometer, a pressure sensor and/or an inertial measurement unit is configured to acquire the vehicle acceleration data and/or angular rotation data.

In an embodiment, the vehicle motion data includes vehicle acceleration data and vehicle angular rotation data, such as vehicle angular velocity data.

In an embodiment, the collision detection module is configured to transform the acquired vehicle acceleration data using the acquired vehicle angular rotation data.

In an embodiment, the vehicle further includes a vehicle control system configured to control the vehicle to a safe stop when the collision registration module registers a collision.

In an embodiment, the vehicle further includes a data logging system configured to store acquired vehicle motion data and environmental data for a predetermined time before and after the collision registration module registers a collision.

In an embodiment, the collision detection module is configured to register a collision between the object and the autonomous vehicle when the determined acceleration vector is correlated to the determined velocity vector of the object and when the determined acceleration vector has a magnitude greater than a predetermined threshold magnitude. The predetermined threshold magnitude may be dynamically determined based on the magnitude of the velocity vector of the object.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses of the present invention. Furthermore, there is no intention to be bound by any expressed or implied theory presented in the preceding technical field, background, brief summary or the following detailed description. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, any connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
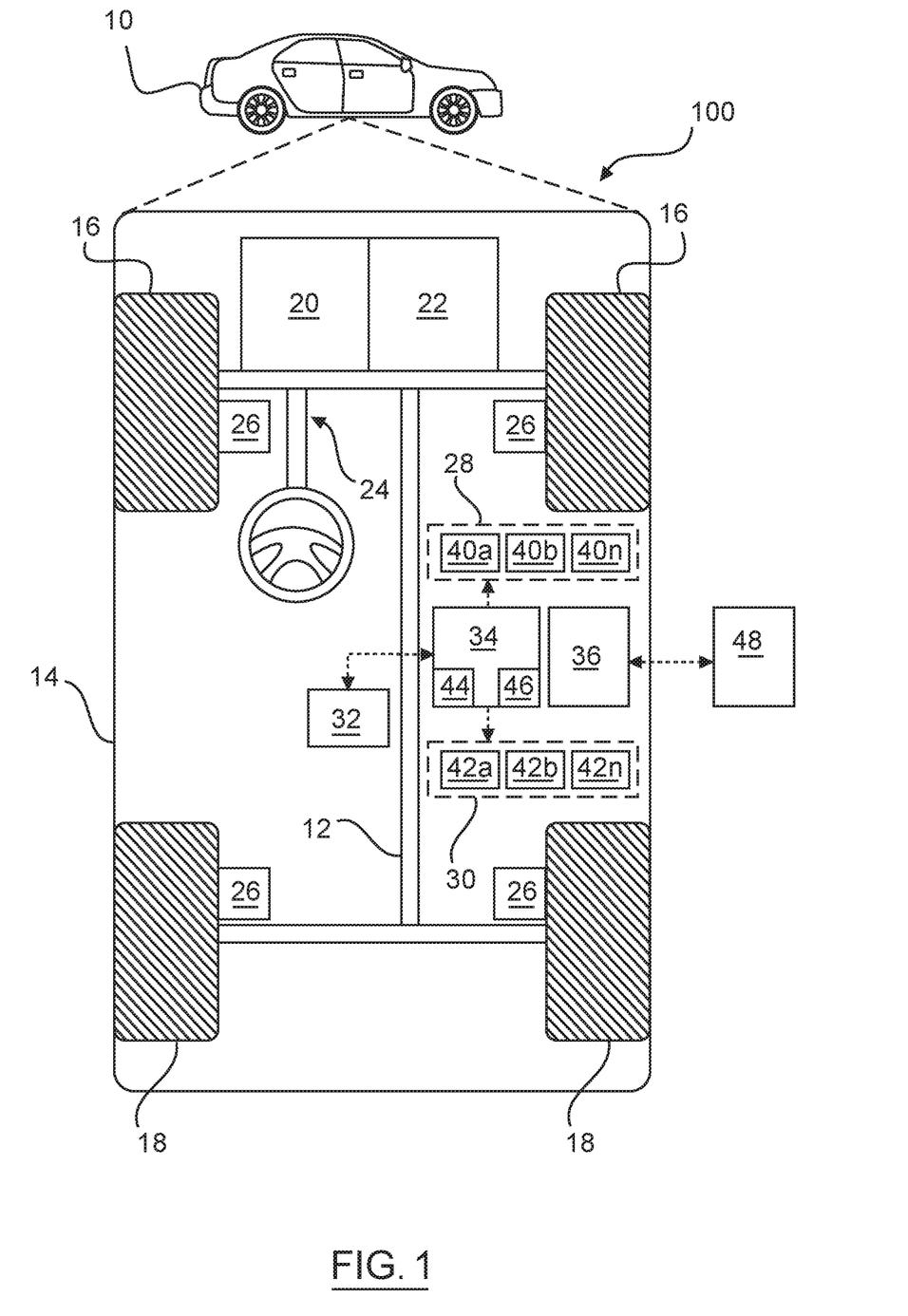
FIG. 1 is a functional block diagram illustrating an autonomous vehicle having an autonomous driving system, in accordance with various embodiments.

With reference to FIG. 1, an autonomous guidance system is shown generally at 100. The autonomous vehicle guidance system is associated with a vehicle 10 in accordance with various embodiments. In general, the autonomous guidance system 100 obtains measurements of the environment surrounding the vehicle 10 from sensors and intelligently controls the vehicle 10 based thereon.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the autonomous guidance system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensors 40a-40n that sense observable conditions of the exterior environment and/or the interior environment of the autonomous vehicle 10. The sensors 40a-40n can include different types of sensors such as, but not limited to, Radars, LIDARs, global positioning systems, optical cameras, thermal cameras, ultrasonic sensors, inertial measurement units, pressure sensors, accelerometers, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
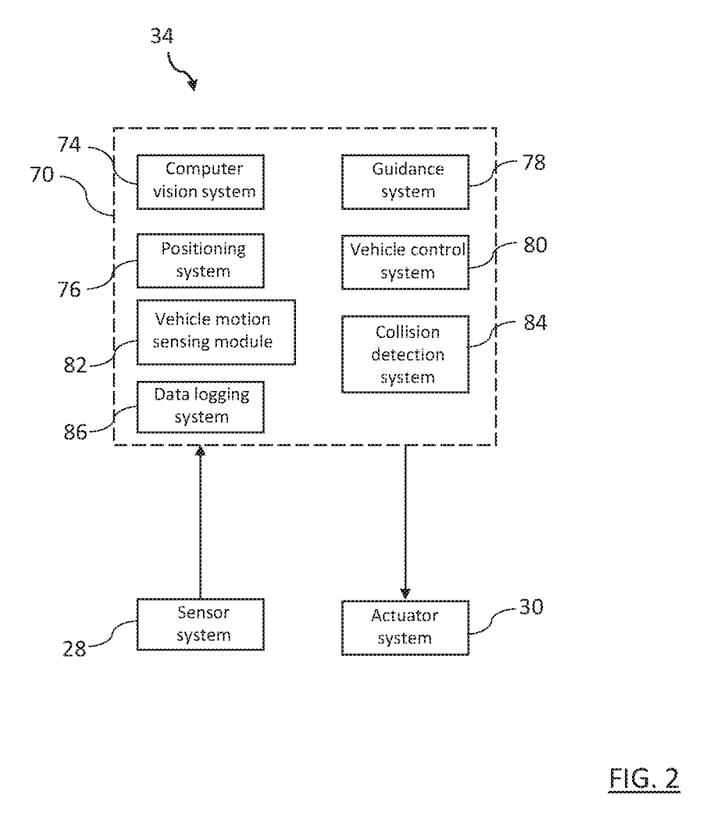
FIG. 2 is a block diagram illustrating systems and subsystems of the autonomous driving system, in accordance with various embodiments.

In some embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 7). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the autonomous guidance system 100 and, when executed by the processor 44, allow for the detection of collisions between the vehicle 10 and objects in the environment surrounding the vehicle 10, as will be explained in more detail below.

In accordance with various embodiments, the controller 34 implements an autonomous driving system (ADS) 70 as shown in FIG. 2. That is, suitable software and/or hardware components of the controller 34 (such as the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 2, the autonomous driving system 70 can include a computer vision system 74, a positioning system 76, a guidance system 78, and a vehicle control system 80. As can be appreciated, in various embodiments, the instructions of the autonomous driving system may be organized into any number of systems (e.g., combined, further partitioned, etc.) as the disclosure is not limited to the present examples. In general, the computer vision system 74 synthesizes and processes sensor data from environmental sensors and predicts the presence, location, classification, velocity and/or path of objects and features of the environment of the vehicle 10. As used herein, environmental sensors include sensors that are capable of monitoring parameters associated with the environment external to the vehicle 10, such as optical cameras, LIDARs, Radars, etc. The environmental sensors are included in the sensor system 28.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals to transmit to the actuator system 30 in order to control the vehicle 10 according to the determined path.

The autonomous driving system 70 also includes a vehicle motion sensing module 82. The vehicle motion sensing module 82 is configured to use vehicle motion data acquired from the vehicle motion sensors to determine acceleration vectors of the vehicle 10, as will be explained in greater detail below.

As used herein, vehicle motion sensors include sensors which are suitable for detecting the acceleration of the vehicle 10, either directly or indirectly, and/or sensors which are suitable for detecting vehicle rotational data such as vehicle angular velocity data. These types of sensors may include: inertial measurement units, accelerometers, pressure sensors, gyroscopes, rate sensors, MHD sensors or other types of sensors. The vehicle motion sensors are included in the sensor system 28.

The autonomous driving system 70 also includes a collision detection system 84. The collision detection system 84 is configured to determine collision events between the vehicle 10 and other objects, as will be explained in greater detail below.

As explained above, in various embodiments, the computer vision system 74 synthesizes and processes sensor data from environmental sensors and predicts the presence, location, classification, and/or path of objects and features of the environment of the vehicle 10.

Figure 3:
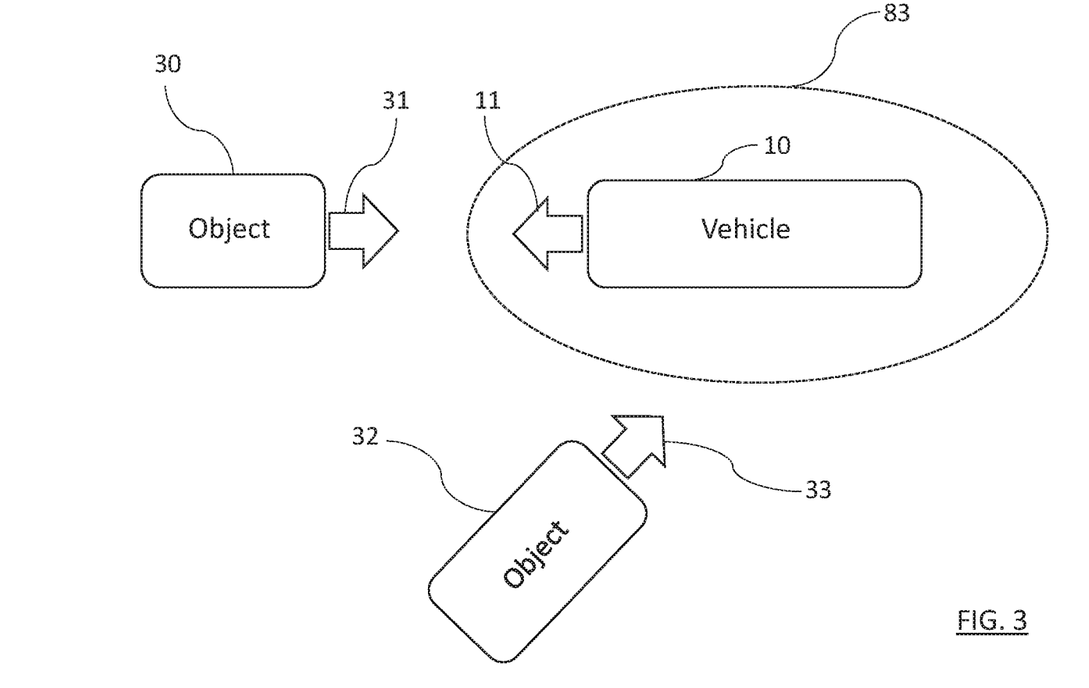
FIG. 3 is a schematic diagram illustrating the operation of a collision detection system in accordance with various embodiments.

In various embodiments, the computer vision system 74 monitors certain parameters associated with objects and features of the environment. As shown in FIG. 3, the computer vision system 74 is configured to use data acquired from the environmental sensors to monitor the distance of objects 30, 32 (represented schematically in FIG. 3 as other vehicles) from the vehicle 10. Furthermore, the computer vision system 74 is also configured to use data acquired from the environmental sensors to monitor the relative velocity vectors 31, 33 of the objects 30, 32 to the vehicle 10.

Monitoring the relative velocity vectors 31, 33 of the objects 30, 32 to the vehicle 10 incorporates monitoring both the relative scalar speed of the objects 30, 32 to the vehicle 10 and also the "heading" or direction of travel of these objects 30, 32 relative to the vehicle 10.

As is also shown in FIG. 3, the computer vision system 74 also defines a collision perimeter 83 a pre-determined distance away from the vehicle 10. The purpose of the collision perimeter will be explained in greater detail below. The distance of the collision perimeter from the vehicle 10 may be a static distance, or may be a dynamic distance that is dynamically calculated, for example on the basis of the relative velocity of objects surrounding the vehicle. A dynamically-adjusted collision perimeter could compensate for latency in the collision detection system.

The acquired data relating to the relative velocities 31, 33 and distances of the objects 30, 32 surrounding the vehicle 10 is transferred from the computer vision system 74 to the collision detection system 84.

The collision detection system 84 is configured to determine if any one of the monitored relative velocities 31, 33 of the objects 30, 32 surrounding the vehicle 10 means that the associated object is likely to intercept with the vehicle's determined path, when taking into account the vehicle's own velocity vector 11. In various embodiments, when an intercept between an object is determined by the collision detection system 84 to be likely, that object is flagged by the positioning system as a threat. As can be seen in the situation in FIG. 3, both of objects 30, 32 have velocity vectors 31, 33 that would likely cause an intercept with the vehicle 10, when taking into account the vehicle's own velocity vector 11. As such, for the situation shown in FIG. 3, the collision detection system 84 would flag both of objects 30, 32 as threats.

After the flagging of an object as a threat, the computer vision system 74, in conjunction with the collision detection system 81, monitors the distance and velocity vectors of each threat relative to the vehicle 10. At regular intervals, the monitored distance of each threat relative to the vehicle 10 is compared to the collision perimeter 83, which may be static, or which may be dynamically updated based on the velocity vectors 31, 33 of the objects 30, 32, as detailed above Referring now to FIG. 4, which shows the temporal development of the situation in FIG. 3, the positions of the threats 30, 32 have changed such that the velocity vector 33 and position of the threat 32 means that this threat 32 is no longer likely to intercept with the vehicle 10. If a threat's relative velocity vector changes such that an intercept of the threat with the vehicle 10 is no longer likely, the threat may be "de-classified" as being a threat by the collision detection system 84.

Figure 4:
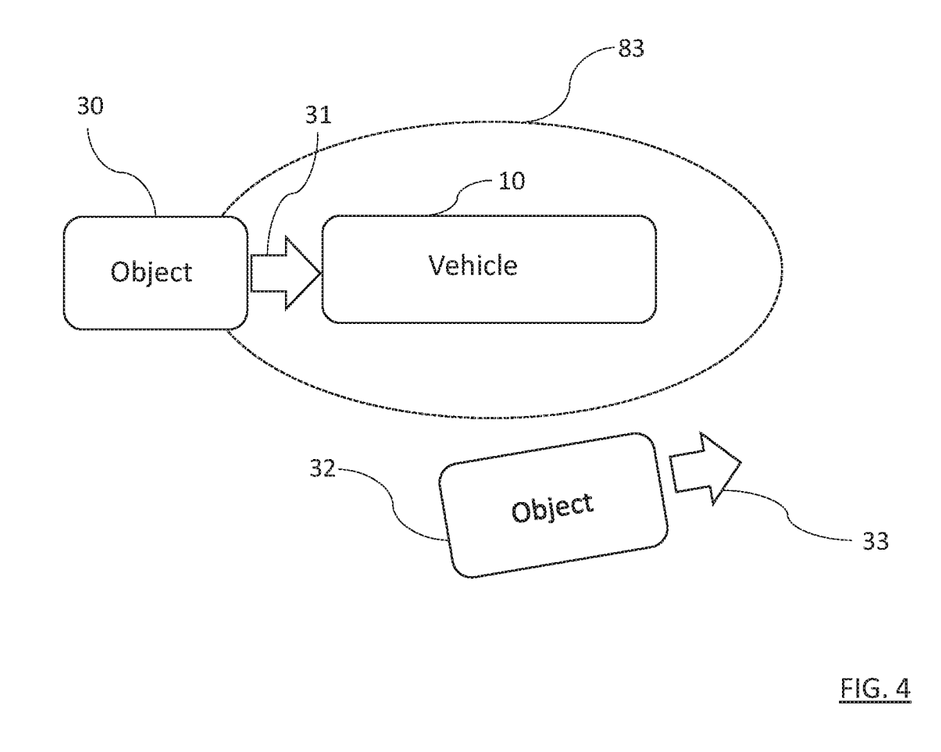
FIG. 4 is another schematic diagram illustrating the operation of a collision detection system in accordance with various embodiments.

As can also be seen in FIG. 4, the velocity vector 31 of threat 30 has not changed in a manner that would avoid an intercept with the vehicle 10, and the threat 30 has entered inside the collision perimeter 83.

If a threat enters the collision perimeter 83 (i.e., the monitored distance between the threat and the vehicle 10 is less than the static or dynamically updated predetermined distance from the vehicle 10 which defines the collision perimeter 83), the collision detection system 81 begins monitoring the vehicle motion data received from the vehicle motion sensors of the sensor system 28. As explained above, the vehicle motion sensors allow for the direct or indirect determination of an acceleration vector of the vehicle 10 (i.e., the direction and magnitude of an acceleration of the vehicle).

Figure 5:
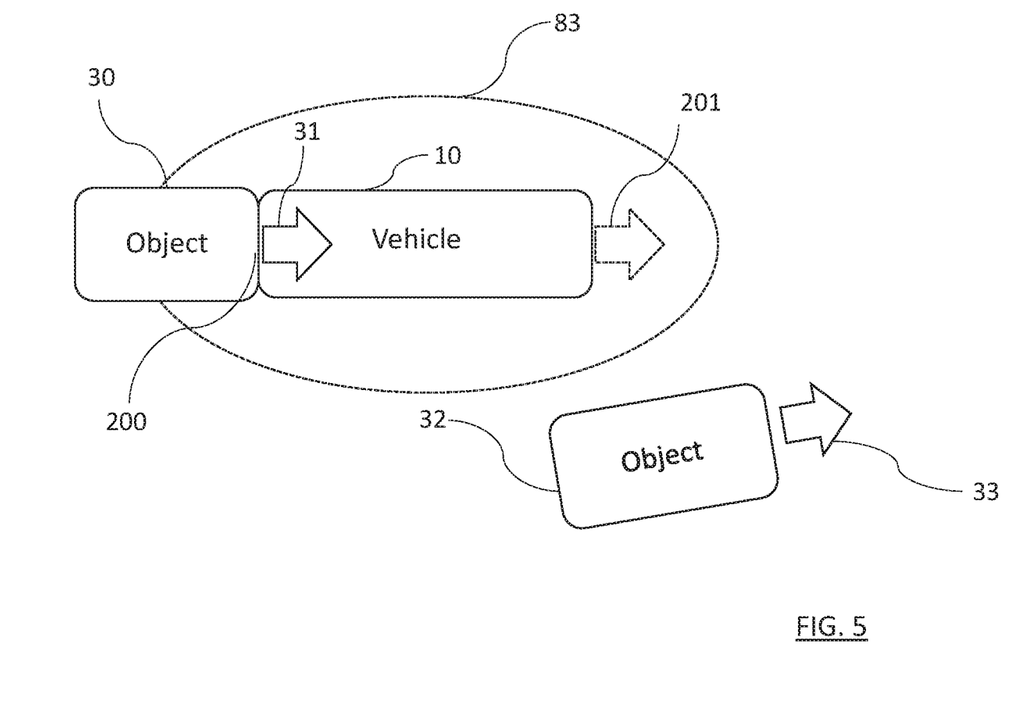
FIG. 5 is another schematic diagram illustrating the operation of a collision detection system in accordance with various embodiments.

As can be seen in FIG. 5, which shows the temporal development of the situation in FIG. 4, the threat 30 collides with the vehicle 10 at location 200. The collision of the threat 30 with the vehicle 10 produces an acceleration vector 201 of the vehicle 10 that can be correlated to the direction of the velocity vector 31 of the threat 30. In other words, the collision of the threat 30 with the vehicle 10 produces an acceleration vector 201 of the vehicle 10 that can be attributed to the direction of the velocity of the threat, when taking into account the vehicle's 10 kinematic movement constraints. The acceleration vector 201 is detected by the vehicle motion sensors of the sensor system 28, and the associated vehicle motion data, is transferred to the collision detection system 84. In an embodiment, the vehicle motion data includes vehicle acceleration data and vehicle angular rotation data.

When an acceleration vector 201 of the vehicle 10 is detected by a vehicle motion sensor when a threat is inside the collision perimeter 83, the collision detection system 84 is configured to compare the detected acceleration vector 201 to the monitored velocity vector 31 of the threat 30 to determine if these vectors can be correlated. If the detected acceleration vector 201 of the vehicle 10 can be correlated to the monitored velocity vector 31 of the threat 30 when the threat 30 is inside the collision perimeter 83, it is highly likely that the detected acceleration vector 201 of the vehicle 10 has been caused by the threat 30 colliding with the vehicle 10. As such, if the detected acceleration vector 201 of the vehicle 10 can be correlated to the monitored velocity vector 31 of the threat 30 which is inside the collision perimeter 83, the collision detection system 84 registers that there has been a collision between the vehicle 10 and the threat 30.

In one embodiment, the comparison of the detected acceleration vector 201 of the vehicle 10 to the monitored velocity vector 31 of the threat 30 is achieved by comparing the direction of the acceleration vector 201 of the vehicle 10 to the monitored velocity vector 31 of the threat. If the detected acceleration vector 201 is in substantially the same direction as the monitored velocity vector 31, the collision detection system 84 determines that the acceleration vector 201 is correlated to the monitored velocity vector 31 and registers a collision.

In some situations, a direct comparison of the directions of the detected acceleration vector 201 and the monitored velocity vector 31 is not the most accurate method of detecting collisions between the threat and the vehicle. In particular, certain kinematic constraints of the vehicle 10 may cause the direction of a detected acceleration vector 201 to be in a different direction to the direction of the velocity vector 31, even if the velocity vector 31 of the threat 30 was the cause of the acceleration vector 201 via a collision. This may occur when, for example, vehicle tire constraints change the acceleration vector 201. In such situations, it is desirable to correlate the acceleration vector 201 with the velocity vector 31 via another method.

In an embodiment, the acceleration vector 201 is correlated to the velocity vector through a transformation algorithm, using vehicle rotational data. In particular, in an embodiment, the vehicle motion sensors are configured to acquire vehicle rotational data, such as the angular velocity of the vehicle 10, as well as linear acceleration data of the vehicle 10. During scenarios where the acceleration detected by the vehicle motion sensor is not the same as the acceleration experienced by the vehicle's center of gravity (for example, when the vehicle is not moving in a straight line or due to other vehicle kinematic constraints such as tire constraints), the acquired vehicle rotational data is used to mathematically transform the acceleration data acquired at the vehicle motion sensor into acceleration data which would have been experienced at the vehicle's center of gravity. After this transformation, the transformed acceleration data can be correlated with the monitored velocity vector 31 of the threat 30, for example via a free body diagram analysis, in which the vehicle is modeled as a single point mass at its own center of gravity, and Newtonian mechanics are used to correlate the detected acceleration vector to the threat's velocity vector. As will be appreciated, the transformation of acceleration data acquired at the vehicle motion sensor to acceleration data which would be experienced at the vehicle's center of gravity requires knowledge of the vehicle motion sensor's mounting location and the location of the center of gravity of the vehicle.

By comparing the acceleration vector 201 of the vehicle 10 with the monitored velocity vector 31 of the threat 30 inside the collision perimeter 83, along with the vehicle kinematic constraints, and then using this comparison to determine if there is a correlation between these vectors, allows for the determination of if a collision has occurred between the vehicle 10 and the threat 30. This technique avoids certain drawbacks associated with other collision detection techniques.

Specifically, if a hypothetical collision detection technique were to utilize only a single type of sensor in isolation (such as the use of environmental sensors in isolation or vehicle motion sensors in isolation) to detect a collision, there is an increased likelihood of a false positive collision being detected. False positives are especially likely for low-speed collision events. For example, if a collision detection system were to rely only upon the comparison of the output from a vehicle motion sensor (such as an accelerometer) to a predetermined threshold in order to detect a collision, this collision detection system would be unable to accurately distinguish low speed collision events from other events that may cause vehicle accelerations, which events occur during the normal driving environment (such as encountering a pothole). Furthermore, if a low speed collision event does not produce a large enough magnitude of acceleration of the vehicle to exceed the threshold acceleration value for registering collisions, the low speed collision event may not be detected by the vehicle 10.

Still further, if a collision detection system relied only upon comparing the distance between an external object to a predetermined collision distance from the vehicle 10 using an environmental sensor, situations where an external object passes very close to the vehicle 10, but does not actually collide with the vehicle 10, may be falsely flagged as a collision by the collision detection system. Specifically, even though the external object may pass close enough to the vehicle 10 for a pre-determined threshold distance indicating a collision to be satisfied, physical confirmation of the collision is not provided.

As such, the use of multiple different types of sensor (such as vehicle motion sensors and environmental sensors) reduces the likelihood of false positive collisions being detected by the collision detection system 84.

Furthermore, by requiring a comparison between the acceleration vector 201 experienced by the vehicle 10 with the threat's velocity 31 in order to determine if there is a correlation between these vectors and therefore to register a collision, the threshold acceleration value required for registering a collision may be reduced as compared to a collision detection system that only uses a single type of sensor (such as an accelerometer or pressure sensor).

For example, a hypothetical collision detection system that uses only vehicle motion sensors (such as accelerometers) to detect collisions would require a relatively higher acceleration to be detected before a collision was registered, in order to prevent small accelerations vectors of the vehicle 10 (such as the slamming of a vehicle door, encountering a pothole during driving, or significant air pressure changes due to vehicle sound systems) from falsely triggering the registration of a collision. With the collision detection system of the present disclosure, however, the magnitude of the acceleration threshold value may be relatively lower for registering a collision. This is because the comparison of the threat velocity vector direction to the acceleration vector direction, and the comparison of the distance of the threat from the vehicle 10, increases the likelihood that any detected accelerations of the vehicle 10 are due to collision with the monitored threat. As such, a relatively smaller detected acceleration vector threshold may be used to detect collisions, due to the increased probability that the acceleration is due to a collision with the monitored threat and not due to other, non-collision events.

In various embodiments, the magnitude of the detected acceleration vector 201 must be greater than a pre-determined acceleration magnitude threshold in order for a collision to be registered by the collision detection system 84. In various embodiments, the pre-determined acceleration magnitude threshold is a dynamic threshold, the value of which threshold is determined by the collision detection system 84 on the basis of the determined threat's velocity. This allows for a further reduction in false positive collision registrations whilst still allowing for a lower acceleration threshold as compared to collision detection techniques where only vehicle motion sensors are utilized.

After a collision is detected by the collision detection system 84, the collision detection system 84 instructs the vehicle control system 80 to control the vehicle 10 to safely stop close to the scene of the collision, in compliance with country and/or state laws. In one embodiment, the vehicle control system 80 will control the vehicle to safely stop in a driving lane after a collision is registered.

In various embodiments, as shown in FIG. 2, the vehicle 10 includes a data logging system 86. In an embodiment, the collision detection system 84 instructs the data logging system 86 to store sensor data from the sensor system 28 in the memory 46 around the time of the registered collision. For example, in one embodiment, the data logging system 86 stores all of the environmental and vehicle motion sensor data acquired by the sensors of the sensor system 28 for the 30 seconds preceding a detected collision and for the 5 seconds following the detected collision. In one embodiment, the sensor system data is stored in non-volatile memory, such as KAM. The stored data will then be available for a post facto review of the collision. This post facto review may be useful for machine learning, regulatory, or forensic purposes.

Figure 6:
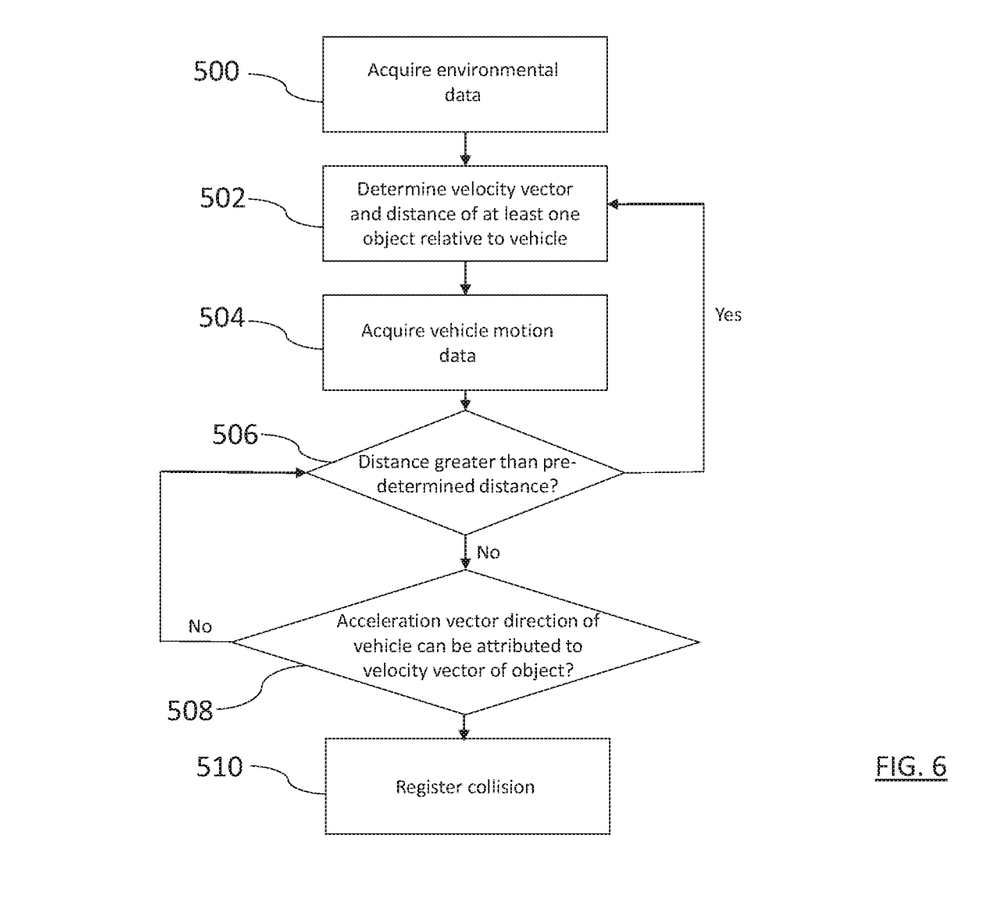
FIG. 6 is a flowchart illustrating a method in accordance with various embodiments.

Referring now to FIG. 6, and with continued reference to FIGS. 1-4, a flowchart is shown illustrating a control method that can be performed by the autonomous driving system 70 of FIG. 2 in accordance with the present disclosure. As can be appreciated in light of the present disclosure, the order of operation within the method is not limited to the sequential execution as illustrated in FIG. 6, but may be performed in one or more varying orders as applicable and in accordance with the present disclosure. In various embodiments, the method can be scheduled to run based on one or more predetermined events, and/or can run continuously during operation of the autonomous vehicle 10.

At step 500 of the method, environmental data is acquired by at least one environmental sensor of the sensor system 28 of the autonomous vehicle 10.

At step 502, the acquired environmental data is used to determine a velocity vector of at least one object relative to the autonomous vehicle 10 and to determine the distance between the at least one object and the autonomous vehicle 10.

At step 504, vehicle motion data is acquired using at least one vehicle motion sensor of the autonomous vehicle 10. The vehicle motion data is used to determine an acceleration vector of the vehicle 10.

At step 506, a comparison is made between the distance between the autonomous vehicle 10 and the at least one object and a pre-determined distance. If the distance between the autonomous vehicle 10 and the object is greater than the pre-determined distance, the method reverts to step 502. If the distance between the autonomous vehicle 10 and the object is less than the pre-determined distance, the method proceeds to step 508.

At step 508, the acceleration vector direction of the vehicle is compared to the velocity vector direction of the object. If an acceleration vector is correlated to the velocity vector of the threat, the method proceeds to step 510. If an acceleration vector is not correlated to the velocity vector of the threat, the method reverts to step 506.

At step 510, a collision is registered. In some embodiments, in response to a collision being registered, the vehicle may be controlled to be brought safely to a stop near the collision.

Figure 7:
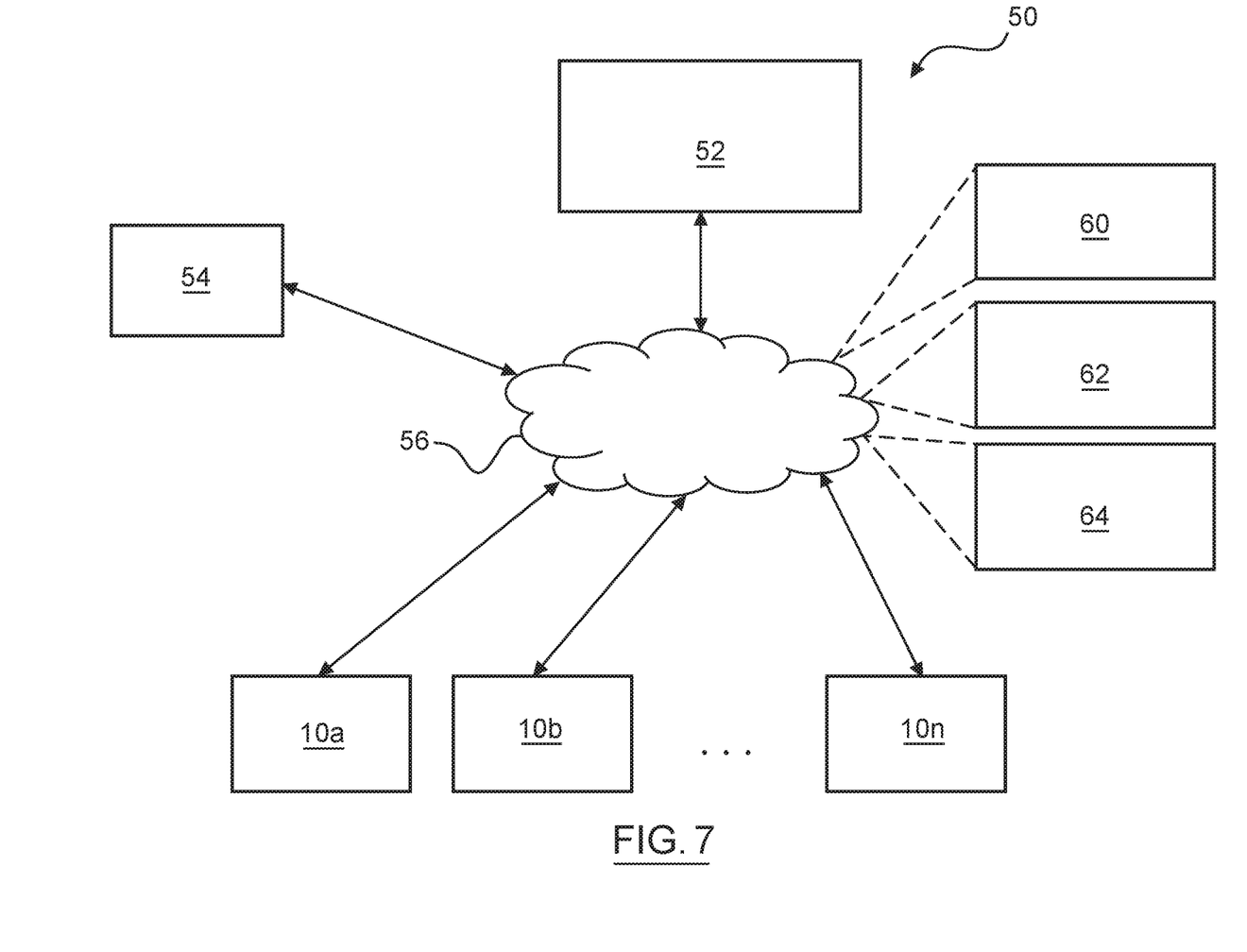
FIG. 7 is a functional block diagram illustrating a transportation system having one or more autonomous vehicles of FIG. 1, in accordance with various embodiments.

With reference now to FIG. 7, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 7 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 7, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An autonomous driving system for a vehicle, the autonomous driving system comprising:
   a computer vision system configured to, by a processor, use acquired environmental data to determine a velocity vector of an object relative to the vehicle and a distance between the object and the vehicle;
   a vehicle motion sensing module configured to, by a processor, use acquired vehicle motion data to determine an acceleration vector of the vehicle; and
   a collision detection module configured to, by a processor, register a collision between the object and the vehicle based on a comparison of the determined acceleration vector and the determined velocity vector of the object when the determined distance between the object and the vehicle is less than a predetermined amount, wherein the collision detection module is configured to register a collision only when the determined acceleration vector has a magnitude greater than a predetermined threshold magnitude, wherein the predetermined threshold magnitude is dynamically determined based on the magnitude of the velocity vector of the object.

2. The autonomous driving system of claim 1, further comprising at least one environmental sensor selected from the group of: Radar, LIDAR, and an optical camera; the at least one environmental sensor being configured to acquire the environmental data.

3. The autonomous driving system of claim 1, further comprising at least one vehicle motion sensor selected from the group of an accelerometer, a pressure sensor and an inertial measurement unit, the at least one vehicle motion sensor being configured to acquire the vehicle motion data.

4. The autonomous driving system of claim 1, wherein the autonomous driving system further comprises a vehicle control system configured to control the vehicle to a stop when the collision detection module registers a collision.

5. The autonomous driving system of claim 1, wherein the acquired vehicle motion data includes vehicle acceleration data.

6. The autonomous driving system of claim 1, wherein the acquired vehicle motion data includes vehicle angular velocity data.

7. A computer-implemented method of detecting a collision between an autonomous vehicle and an object, the method comprising:
   using at least one environmental sensor, acquiring environmental data;
   determining, using a processor, a velocity vector of an object relative to the autonomous vehicle on the basis of the environmental data;
   determining, using a processor, a distance between the object and the autonomous vehicle on the basis of the sensed environmental data;
   acquiring, using at least one vehicle motion sensor, vehicle motion data and determining, using a processor, an acceleration vector of the autonomous vehicle on the basis of the vehicle motion data; comparing, using a processor, the distance between the object and the autonomous vehicle to a pre-determined distance;
   when the distance between the object and the autonomous vehicle is less than a predetermined distance, comparing the acceleration vector of the autonomous vehicle to the velocity vector of the object;
   comparing the acceleration vector of the autonomous vehicle to a predetermined threshold magnitude, wherein the predetermined threshold magnitude is dynamically determined based on a magnitude of the velocity vector of the object; and
   registering a collision between the object and the autonomous vehicle based on the comparison of the acceleration vector of the autonomous vehicle to the velocity vector of the object, only when a magnitude of the acceleration vector of the autonomous vehicle is greater than the dynamically determined predetermined threshold magnitude.

8. The method of claim 7, wherein the at least one environmental sensor is selected from the group of: Radar, LIDAR, and an optical camera.

9. The method of claim 7, wherein the at least one vehicle motion sensor is selected from the group of: an accelerometer, a pressure sensor and an inertial measurement unit.

10. The method of claim 7, further comprising the step of controlling the autonomous vehicle to a stop when a collision is registered.

11. The method of claim 7, further comprising the step of storing the acquired vehicle motion data and environmental data for a predetermined time before and after registering a collision.

12. An autonomous vehicle, comprising an autonomous driving system, the autonomous driving system comprising:
   a computer vision system configured to, by a processor, use acquired environmental data to determine a velocity vector of an object relative to the autonomous vehicle and a distance between the object and the autonomous vehicle;
   a vehicle motion sensing module configured to, by a processor, use acquired vehicle motion data to determine an acceleration vector of the autonomous vehicle; and
   a collision detection module configured to, by a processor, register a collision between the object and the autonomous vehicle based on a comparison of the determined acceleration vector and the determined velocity vector of the object when the determined distance between the object and the autonomous vehicle is less than a predetermined amount, wherein the collision detection module is configured to register a collision between the object and the autonomous vehicle only when the determined acceleration vector has a magnitude greater than a predetermined threshold magnitude, wherein the predetermined threshold magnitude is dynamically determined based on a magnitude of the velocity vector of the object.

13. The autonomous vehicle of claim 12, further comprising at least one environmental sensor selected from the group of; Radar, LIDAR, and an optical camera to acquire the environmental data.

14. The autonomous vehicle of claim 12, further comprising at least one vehicle motion sensor selected from the group of an accelerometer, a pressure sensor and an inertial measurement unit is configured to acquire the vehicle motion data.

15. The autonomous vehicle of claim 12, wherein the autonomous driving system further comprises a vehicle control system configured to control the autonomous vehicle to a stop when the collision detection module registers a collision.

* * * * *